(12) United States Patent
Yamamoto

(10) Patent No.: US 7,575,535 B2
(45) Date of Patent: Aug. 18, 2009

(54) FRICTION DRIVE DEVICE AND TRANSMISSION USING THE FRICTION DRIVE DEVICE

(75) Inventor: Takeshi Yamamoto, Yokosuka (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 224 days.

(21) Appl. No.: 11/652,036

(22) Filed: Jan. 11, 2007

(65) Prior Publication Data

US 2009/0170656 A1    Jul. 2, 2009

(30) Foreign Application Priority Data

Jan. 16, 2006    (JP)    ............... 2006-006848

(51) Int. Cl.
*F16H 15/38*    (2006.01)
(52) U.S. Cl. ............... 476/42; 476/61; 476/64; 476/45
(58) Field of Classification Search ............... 476/40, 476/42, 61, 64, 65, 67, 45
See application file for complete search history.

(56) References Cited

U.S. PATENT DOCUMENTS

| | | | |
|---|---|---|---|
| 2,858,706 A | 11/1958 | Alexandersson | |
| 6,849,025 B2 * | 2/2005 | Chikaraishi et al. | ............ 476/21 |
| 2002/0147068 A1 * | 10/2002 | Chikaraishi et al. | ............ 476/21 |
| 2003/0106734 A1 * | 6/2003 | Nagai et al. | ................. 180/233 |
| 2003/0176254 A1 * | 9/2003 | Elser et al. | .................... 476/40 |
| 2005/0143211 A1 | 6/2005 | Yamamoto | |

FOREIGN PATENT DOCUMENTS

| | | |
|---|---|---|
| JP | 2005-133859 | 5/2005 |
| JP | 2005-188701 | 7/2005 |
| JP | 2005-249005 | 9/2005 |

* cited by examiner

*Primary Examiner*—David M Fenstermacher
(74) *Attorney, Agent, or Firm*—Drinker Biddle & Reath LLP

(57) ABSTRACT

A friction drive device transmits torque by frictional contact between rollers. The friction drive device includes a casing, a drive roller that is supported for relative rotation with respect to the casing, a driven roller that is supported for relative rotation with respect to the casing, a cam mechanism that presses the drive roller and the driven roller into contact with each other, and a damper. The cam mechanism includes a surface that is disposed at an angle with respect to a tangent of the contact between the drive roller and the driven roller, and includes a rotational support part that is disposed on the surface and supports one of the drive roller and the driven roller such that displacement along the surface by the rotational support part maintains the frictional contact for transmitting the torque. The damper reducing vibration of the rotational support part.

13 Claims, 13 Drawing Sheets

FRICTION DRIVE DEVICE AND TRANSMISSION USING THE FRICTION DRIVE DEVICE

CROSS-REFERENCE TO RELATED APPLICATIONS

This application claims priority under 35 U.S.C. § 119 to Japanese Patent Application No. 2006-006848, filed on Jan. 16, 2006, the disclosure of which is incorporated by reference herein in its entirety.

BACKGROUND OF THE INVENTION

1. Field of the Invention

The invention relates to a friction drive device including a drive roller and a driven roller which are contacted with each other and transmit torque from one of the drive and driven rollers to the other thereof by using friction force which is caused at their contact portions.

2. Description of Related Art

Related rotary drive devices may be equipped with a damper for preventing vibration that is caused by torque fluctuation. An automobile manual transmission is one example of a related rotary drive device that is equipped with a damper that serves as a torque fluctuation absorbing device. The damper includes a plurality of coil springs, friction elements, and the like. In the related damper, the coil springs are arranged so as to act in a circumferential direction of the damper, that is, in a direction of torque application, because the torque is applied in a rotational direction of the transmission shaft.

BRIEF SUMMARY OF THE INVENTION

An object of the invention is to provide a friction drive device, which transmits torque from one roller to another roller, that has a simple construction and can effectively attenuate torque fluctuation in the rotational direction without increasing an axial length of the friction drive device.

In an embodiment, there is provided a friction drive device that includes a casing, a drive roller that is supported for relative rotation with respect to the casing, a driven roller that is supported for relative rotation with respect to the casing, a cam mechanism that presses the drive roller and the driven roller into contact with each other, and a damper. The cam mechanism includes a surface that is disposed at an angle with respect to a tangent of the contact between the drive roller and the driven roller, and includes a rotational support part that is disposed on the surface and supports one of the drive roller and the driven roller such that displacement along the surface by the rotational support part maintains the frictional contact for transmitting the torque. The damper reducing vibration of the rotational support part.

In an embodiment, there is further provided a friction drive transmission for transmitting torque by frictional contact between rollers. The friction drive transmission includes a casing a drive roller that is supported for relative rotation with respect to the casing, a driven roller that is supported for relative rotation with respect to the casing, a cam mechanism that presses the drive roller and the driven roller into contact with each other, a damper, and a shifter. The drive roller includes a first plurality of different diameter rollers, and the driven roller includes a second plurality of different diameter rollers. The cam mechanism includes a cam surface that is disposed at an angle with respect to a tangent of the contact between the drive roller and the driven roller, and includes a rotational support part that is disposed on the cam surface and supporting one of the drive roller and the driven roller, wherein displacement along the surface by the rotational support part maintains the frictional contact for transmitting the torque. The damper reducing vibration of the rotational support part. The shifter selectively and independently contiguously engages one of the first plurality of different diameter rollers with a corresponding one of the second plurality of different diameter rollers.

In an embodiment, there is further provided a friction drive device for transmitting torque by frictional contact between rollers. The friction drive device includes a casing, a drive roller that is supported for relative rotation with respect to the casing, a driven roller that is supported for relative rotation with respect to the casing, a pressing means that presses the drive roller and the driven roller into contact with each other, and a damper. The pressing means displaces at least one of the drive roller and the driven roller in a translational direction that is perpendicular to a rotation axis of the at least one of the drive roller and the driven roller. The damper reducing vibration of the rotational support part.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

First Embodiment

Figure 1:
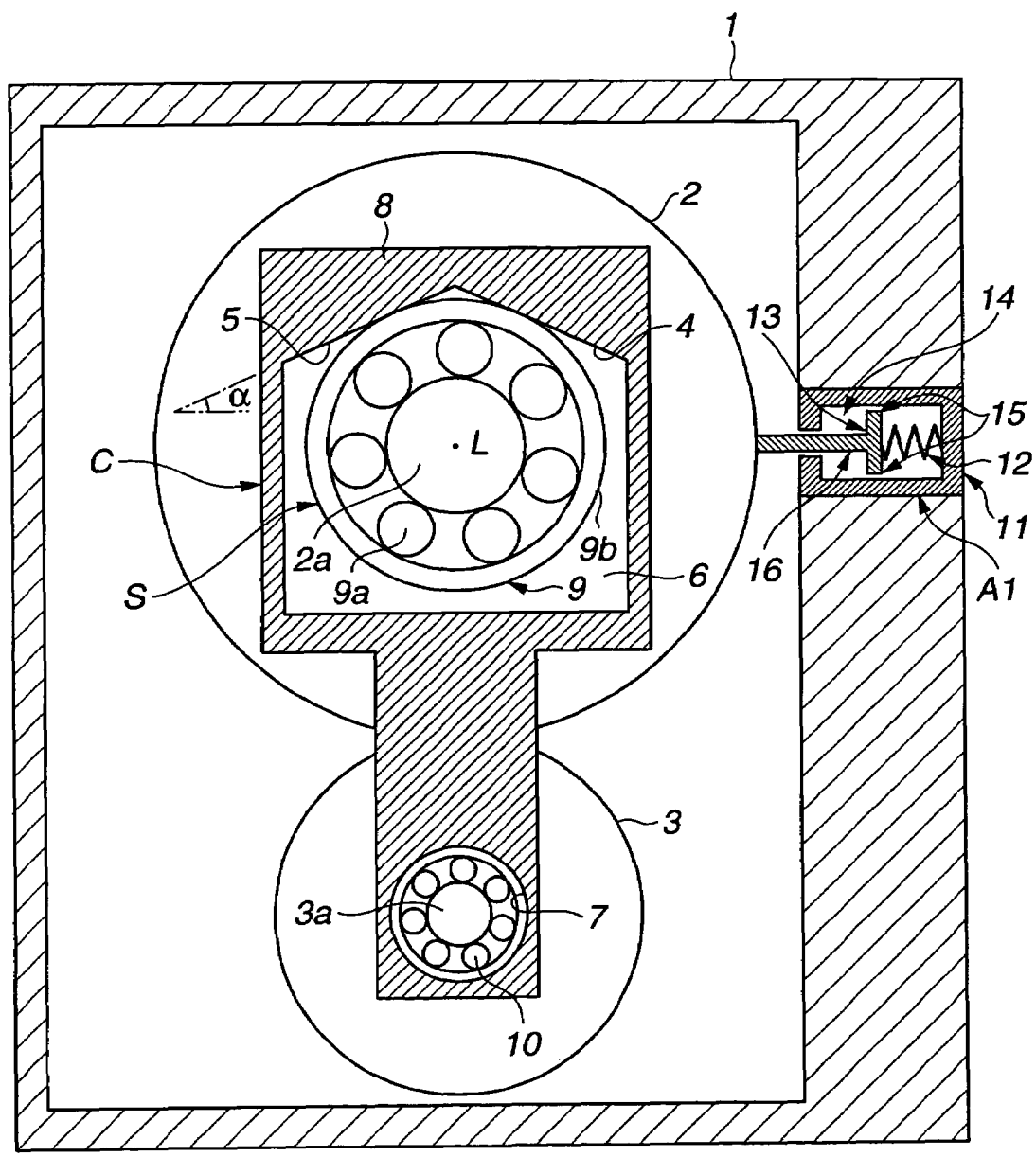
FIG. 1 is a general view showing a friction drive device according to a first embodiment of the invention.

FIG. 1 shows an exemplary friction drive device according to a first embodiment of the invention. The friction drive device according to the first embodiment includes a cam mechanism that presses together a drive roller 2 and a driven roller 3, which are rotatably supported by a casing 1 of the friction drive device. Torque is transmitted between the drive roller 2 and the driven roller 3 by the friction force at contacting portions of the drive roller 2 and the driven roller 3.

Between the drive roller 2 and the driven roller 3, preferably the drive roller 2 is displaceable in a translational direction perpendicular to a rotation axis L of the drive roller 2 in order to cause the friction force at the contacting portions of the drive roller 2 and the driven roller 3. A damping mechanism functions with respect to the displacement of the drive roller 2 in the translational direction.

Preferably, a cam mechanism C may include cam surface portions 4 and 5, which each may have an angle α with respect to a tangent at a contact point between the drive roller 2 and the driven roller 3. The cam mechanism C presses into contact the drive roller 2 and the driven roller 3 by virtue of one or both of the cam surface portions 4 and 5 contiguously engaging a rotational support part S of the drive roller 2.

As illustrated in FIG. 1, the cam mechanism C may include a cam member 8 that is fixed to the casing 1 and includes a drive roller-side opening 6 and a driven roller-side opening 7. The drive roller-side opening 6 is partly defined by the cam surface portions 4 and 5. The cam surface portions 4 and 5 may alternatively or additionally include a curved line portion (not shown). The drive roller-side opening 6 also provides a space that allows translational displacement of the rotational support part S of the drive roller 2. A drive roller supporting bearing 9 and the cam member 8 allow the drive roller 2 to be supported with respect to the casing 1 for relative rotation and displacement in a translational direction along the cam surface portions 4 and 5. The driven roller-side opening 7 is preferably a circular opening that conforms to a shape of an outer face of a driven roller supporting bearing 10, which is disposed on an outer circumferential surface of a roller shaft 3a of the driven roller 3. The driven roller 3 has an axis of rotation that is relatively stationary with respect to the casing 1, and the drive roller 3 is supported by the driven roller supporting bearing 10 and the cam member 8 for relative rotation with respect to the casing 1.

Preferably, the rotational support part S includes the drive roller supporting bearing 9, which is disposed on an outer circumferential surface of a roller shaft 2a of the drive roller 2. The drive roller supporting bearing 9 may include rollers 9a that mutually contacted the roller shaft 2a and a cam follower 9b, which is contacted with the cam surface portions 4 and 5. The rollers 9a may include needles, balls, or any equivalent device that provides an antifriction bearing.

The damping mechanism acts with respect to relative displacement of the drive roller 2 in a translational direction perpendicular to the rotation axis L.

The damping mechanism is preferably a damper A1 that may include a cylinder 11, which may serve as a body of the damper A1 and is filled with a fluid 14 (e.g., oil or another generally incompressible fluid), a piston 13 that is biased by a spring 12 within the cylinder 11, and a piston rod 16 that extends from the piston 13 on an opposite side from the spring 12. Preferably, the piston 13 cooperates with an inner wall of the cylinder 11 and defines a clearance 15 therebetween, and the piston rod 16 acts as a damping member coupling the damper A1 with respect to the drive roller 2 and applying a damping force relative to displacement of the drive roller 2.

In the damper A1, the cylinder 11 may be disposed in or may be formed by the casing 1, and the piston rod 16 may contact an outer circumferential surface of the drive roller 2.

Figure 15:
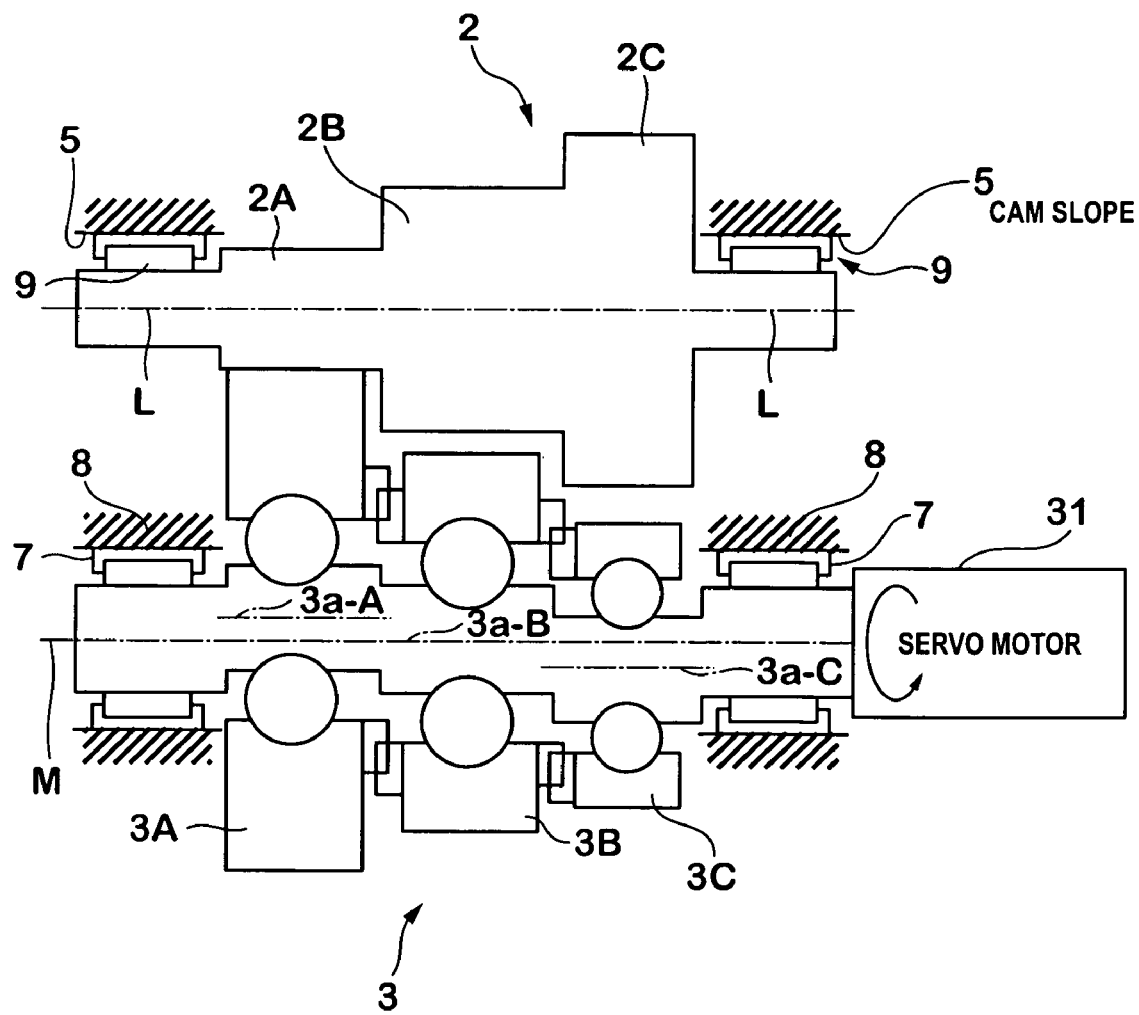
FIG. 15 is a general view showing a transmission to which the friction drive device according to the first to sixth embodiments of the invention is applicable.

The friction drive device according to the first embodiment allows a drive roller and a driven roller to be in press-contact with each other such that a friction force at the contacting portions of the drive and driven rollers transmits torque from one of the drive roller and the driven roller to the other of the drive roller and the driven roller. Such a friction drive device may be incorporated into a transmission, such as that shown in FIG. 15, which includes drive rollers 2A, 2B, and 2C, each of which has a relatively different outer diameter, and driven rollers 3A, 3B, and 3C, each of which also has a relatively different outer diameter. One of the driven rollers 3A, 3B, and 3C is brought into contact with the corresponding one of the drive rollers 2A, 2B and 2C. Each of the driven rollers 3A, 3B, and 3C is rotatably disposed about respective eccentric axes 3a-A, 3a-B, and 3a-C. Preferably, the axes 3a-A, 3a-B, and 3a-C are eccentrically disposed with respect to a central axis M, and may be disposed at equiangular intervals about the central axis M. For example, three eccentric axes may be disposed at 120° intervals about the central axis M and may all be equally spaced from the central axis M. The driven rollers 3A, 3B, and 3C may be selectively and individually shifted into contact with the corresponding drive rollers 2A, 2B, and 2C by rotating the eccentric axes 3a-A, 3a-B and 3a-C about the central axis M with a servomotor 31. Rotational differences that occur upon a shifting operation may be absorbed by relative sliding between the drive and driven roller such that the transmission does not require a synchronizing mechanism. As compared to a parallel-two axis transmission that uses gear sets and a synchronizing mechanism, the transmission shown in FIG. 15 can be remarkably downsized. However, in such a case where a transmission includes a friction drive device, it is desirable to additionally equip the transmission with a damping mechanism that can absorb pulsations that are caused by engine torque, vibration that is caused by rapid fluctuation of rotating torque during a shifting operation, and self-induced vibration that is caused by the friction drive device itself.

Next, functions of the friction drive device of the first embodiment are explained.

Torque Fluctuation Damping Function

In the friction drive device according to the first embodiment, one roller (e.g., drive roller 2 in FIG. 1) is displaceable in a translational direction perpendicular to the rotation axis of the roller in order to provide a friction force at the contacting portions of the drive and driven rollers that is sufficient to transmit torque, and a piston damping mechanism functions with respect to the displacement of the roller in the translational direction. Accordingly, the damper A1 shown in FIG. 1 provides a simple construction that does not increase the axial length of the friction drive device according to the first embodiment, and can effectively damp torque fluctuation that is caused in the rotational direction between the drive roller 2 and the driven roller 3.

In contrast, if the spring and damping elements according to the previously described related damper were to be provided so as to act in the rotational direction of a friction drive device with rollers, the spring and damping elements would be disposed in circumferential positions of semicircular halves of one of the rollers. In such a case, the friction drive device would have a complicated construction and an increased axial length, i.e., greater than the axial length of just the roller. However, the damper A1 of the friction drive device according to the first embodiment is constructed to function with respect to the displacement of the drive roller 2 in the translational direction, whereby the damper A1 can be disposed between a stationary member, e.g., the casing 1, and a roller constituting member, e.g., drive roller 2, without changing the structure of the roller constituting member. The damper A1, therefore, provides a simplified construction as compared to the related damper and does not add to the axial length of the roller constituting member, thereby avoiding an increase in the overall axial length of the friction drive device. Further, the movement of the drive roller 2 that causes the friction force at the contacting portions of the drive roller 2 and the driven roller 3 includes the rotational movement and the translational movement which are associated with each other. Therefore, torque fluctuation in the rotational direction which could occur between the drive roller 2 and the driven roller 3 can be effectively damped by attenuating the torque fluctuation occurring upon the translational movement of the drive roller 2 which is associated with the rotational movement thereof, instead of attenuating the torque fluctuation occurring upon the rotational movement of the drive roller 2. As a result, the friction drive device according to the first embodiment can effectively damp the torque fluctuation in the rotational direction that is caused between the drive roller 2 and the driven roller 3, and with a simple construction and without an increase in the axial length.

Figure 2:
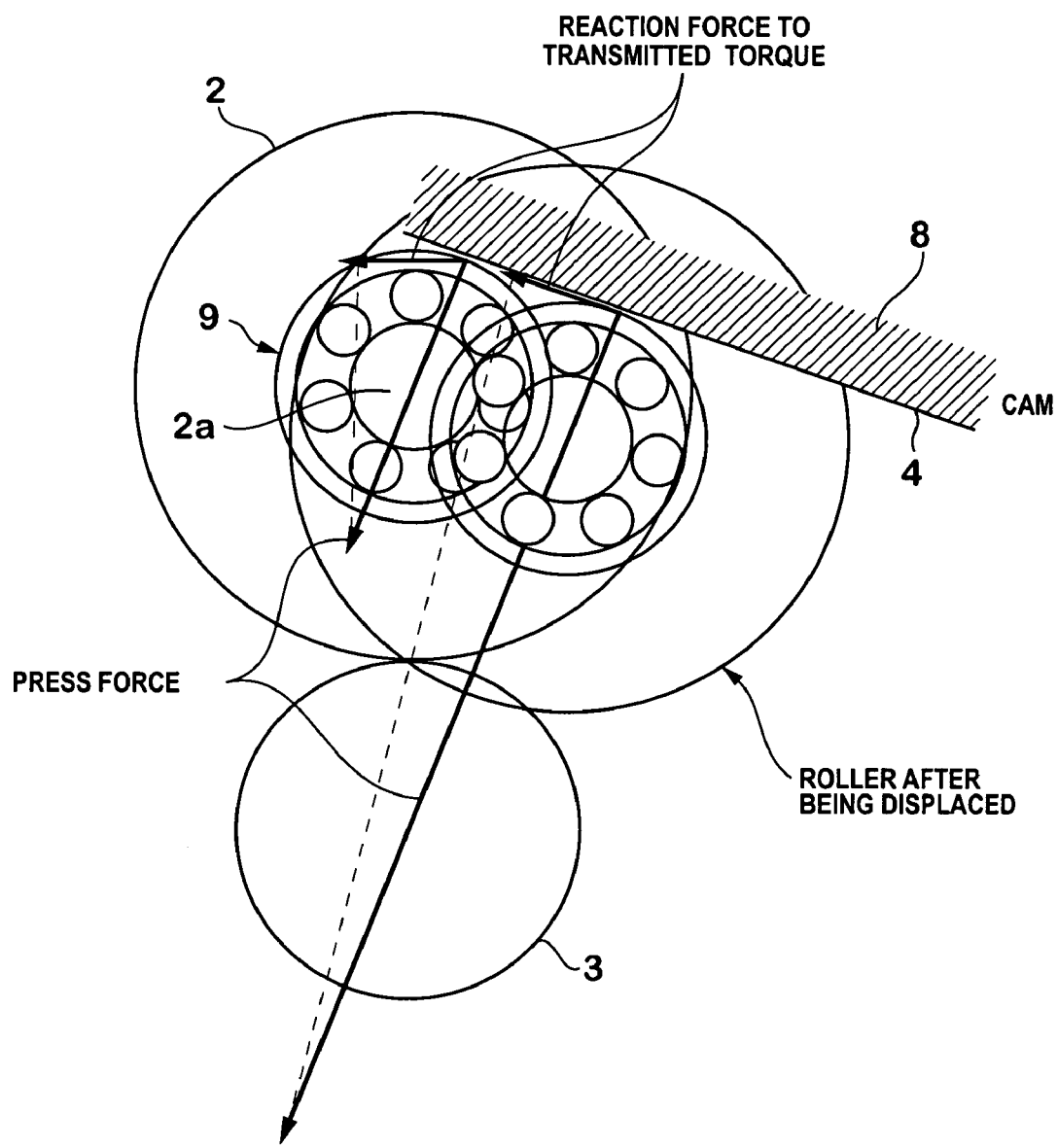
FIG. 2 is an explanatory diagram of translational displacement of a drive roller, showing displacement of the drive roller due to an increase in transmission torque in the friction drive device according to the first embodiment.
Figure 3:
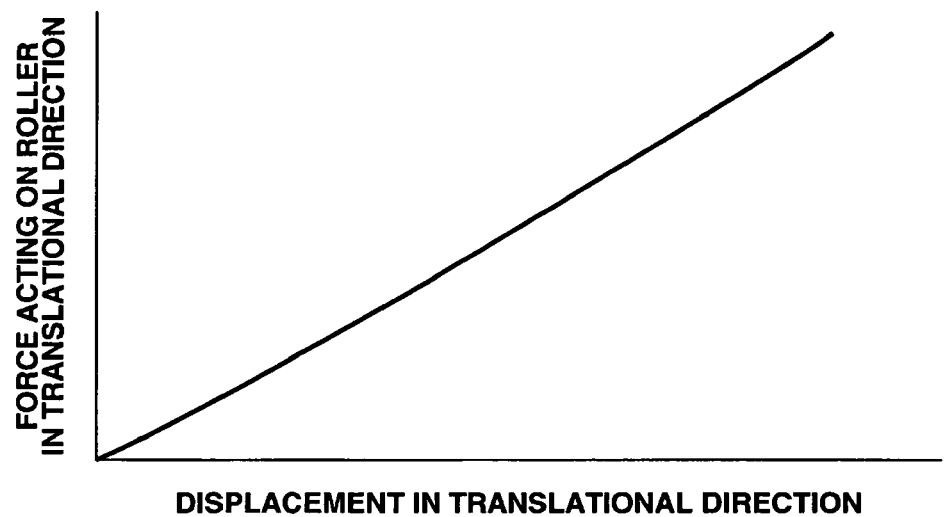
FIG. 3 is a diagram showing a relationship between force in a translational direction that is applied to the drive roller and displacement of the drive roller in the translational direction.

The torque fluctuation damping function of the friction drive device according to the first embodiment is explained hereinafter in detail. In the cam mechanism of the friction drive device according to the first embodiment, when torque is transmitted from the drive roller 2 to the driven roller 3, a reaction force to the transmitted torque is applied to the drive roller 2. The reaction force is borne at contact portions between the drive roller supporting bearing 9 and the cam surface portions 4 and 5. At this time, a force is generated at these contact portions in a direction perpendicular to the contact surface. The generated force can be divided into a horizontal component and a vertical component. Here, the horizontal component is balanced with the reaction force, and the vertical component serves as a press force that is applied to the contacting portions of the drive roller 2 and the driven roller 3. In this construction, the press force that is applied to both of the drive roller 2 and the driven roller 3 is proportional to the transmitted torque. Consequently, as the transmitted torque increases, the press force also increases. As shown in FIG. 2, the cam mechanism C according to the first embodiment increases the press force when the transmitting torque increases. The increased press force may also cause an increase in elastic deformation at the contacting portions of the drive roller 2 and the driven roller 3; however, the drive roller 2 on the side of the cam member 8 is also displaced on the cam surface portion 4 in order to absorb the increased elastic deformation. FIG. 3 shows a relationship between the force that is caused by the transmitted torque, which displaces the drive roller 2 in the translational direction, and the amount of displacement of the drive roller 2 in the translational direction along the cam surface portion 4. As seen from FIG. 3, the force displacing the drive roller 2 in the translational direction is substantially proportional to the displacement of the drive roller 2 in the translational direction. Preferably, a friction coefficient between the drive roller 2 and the cam surface portion 4 is ordinarily 0.1 or less, and an inclination α of the cam surface portion 4 is 6° or less. Therefore, it may be assumed that the drive roller 2 is displaced proportionately in response both to positive torque, i.e., which tends to cause displacement in a translational direction along the cam surface portion 4, and to negative torque, i.e., which tends to cause displacement in a translational direction along the cam surface portion 5.

Figure 4A:
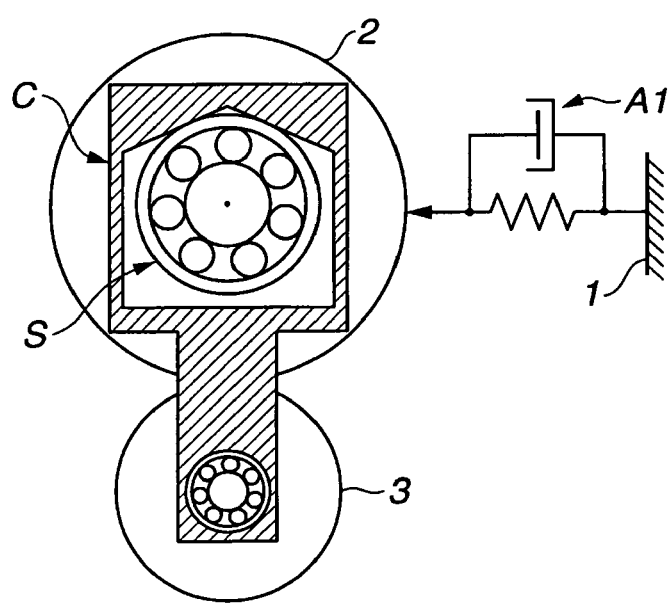
FIGS. 4A and 4B are schematic diagrams showing a kinetic model in the friction drive device according to the first embodiment.
Figure 4B:
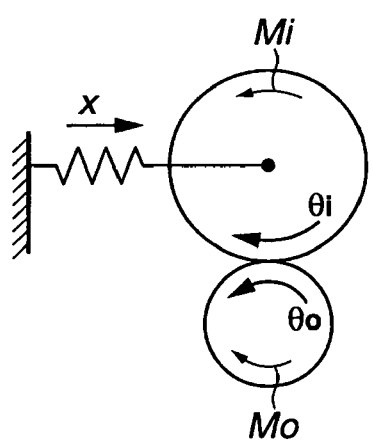

Accordingly, it can be realized that the drive roller 2 on the side of the cam mechanism C has freedom in the translational direction and is supported by a spring. That is, the friction drive device according to the first embodiment is a three-degrees of freedom model in which the translation and the rotation of the drive roller 2 on the cam side and the rotation of the driven roller 3 on the fixed side are attainable. FIGS. 4A and 4B schematically show the three-degrees of freedom model, which is expressed by the following equations of motion:

$$M_i - I_i \ddot{\theta}_i = F_t r_i \quad (1)$$

$$\eta F_t r_o - I_o \ddot{\theta}_o = M_o \quad (2)$$

$$m\ddot{x} + kx = F_t \quad (3)$$

wherein $M_i$ represents drive torque of drive roller, $I_i$ represents inertia of drive roller, $\theta_i$ represents the angle of the drive roller (acceleration by second order differential), $F_t$ represents the transmitting force at the contacting portions of the drive and driven rollers, $r_i$ represents the radius of the drive roller, $\eta$ represents drive efficiency (calculated based on experimentation), $r_o$ represents the radius of driven roller, $I_o$ represents inertia of driven roller, $\theta_o$ represents the angle of the driven roller (acceleration by second order differential), $M_o$ represents transmitted torque of the driven roller, m is mass on the cam-side, k represents a coefficient indicating the relationship between displacement amount in a translational direction and the force acting to move the roller in the translational direction, e.g., as illustrated in FIG. 3, and x represents the amount of displacement. The equation (3) may be substituted into the equations (1) and (2) insofar as the rotational movement of both of the drive roller 2 and the driven roller 3 is related to the translational movement of the cam-side drive roller 2 by the friction force $F_t$. Specifically, when roll acceleration (second order differential values of $\theta_i$ and $\theta_o$) is varied, the displacement x in the translational direction and the acceleration (second order differential values of x) are varied. Conversely, if the displacement x in the translational direction and the acceleration (second order differential values of x) are not varied, the roll acceleration (second order differential values of $\theta_i$ and $\theta_o$) is not varied. Accordingly, if the damping is used in the translational movement to suppress vibration in the translational direction, vibration in the rotational direction can be prevented so that a comparable function as that of the related damper can be achieved.

Figure 5A:
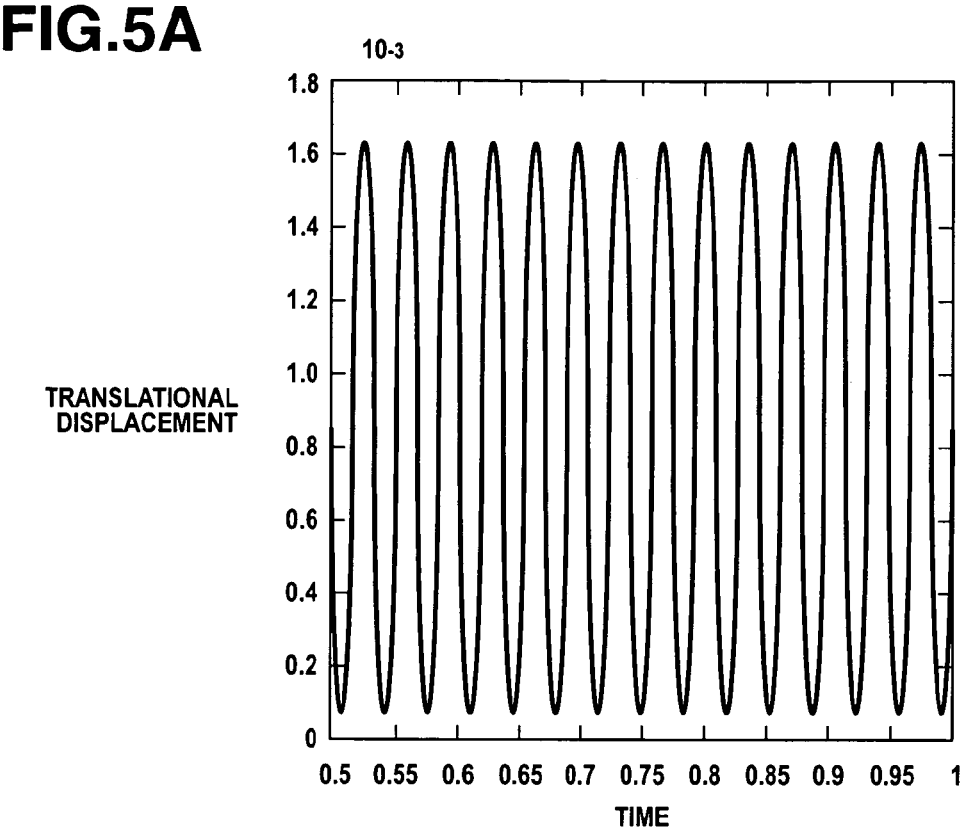
FIG. 5A is a diagram showing a translational displacement characteristic without damping.
Figure 5B:
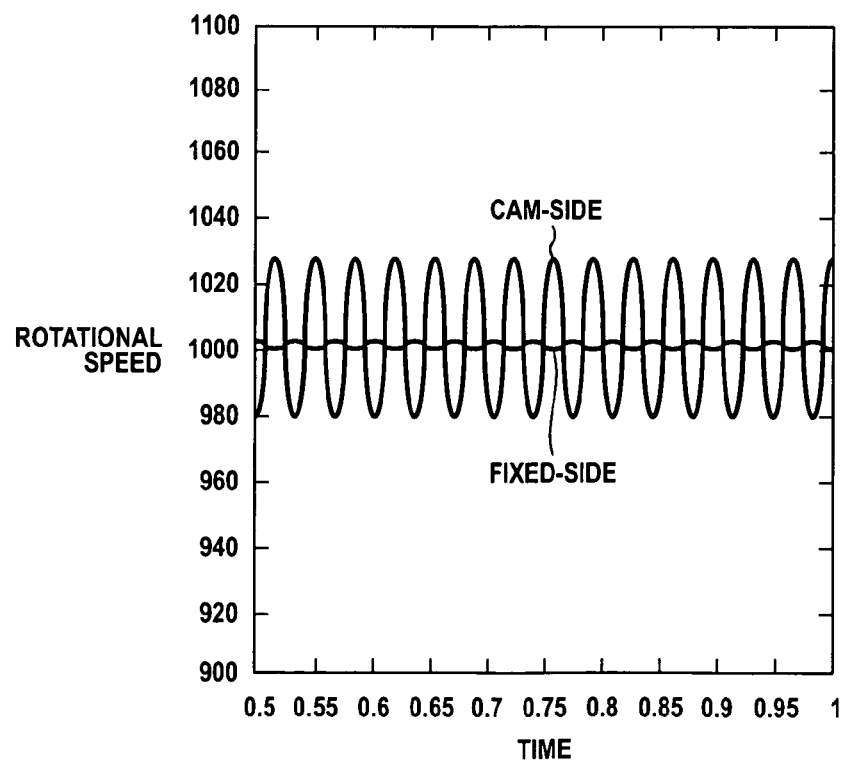
FIG. 5B is a diagram showing a rotational speed characteristic, without damping, of a cam-side roller and a fixed-side roller.
Figure 6A:
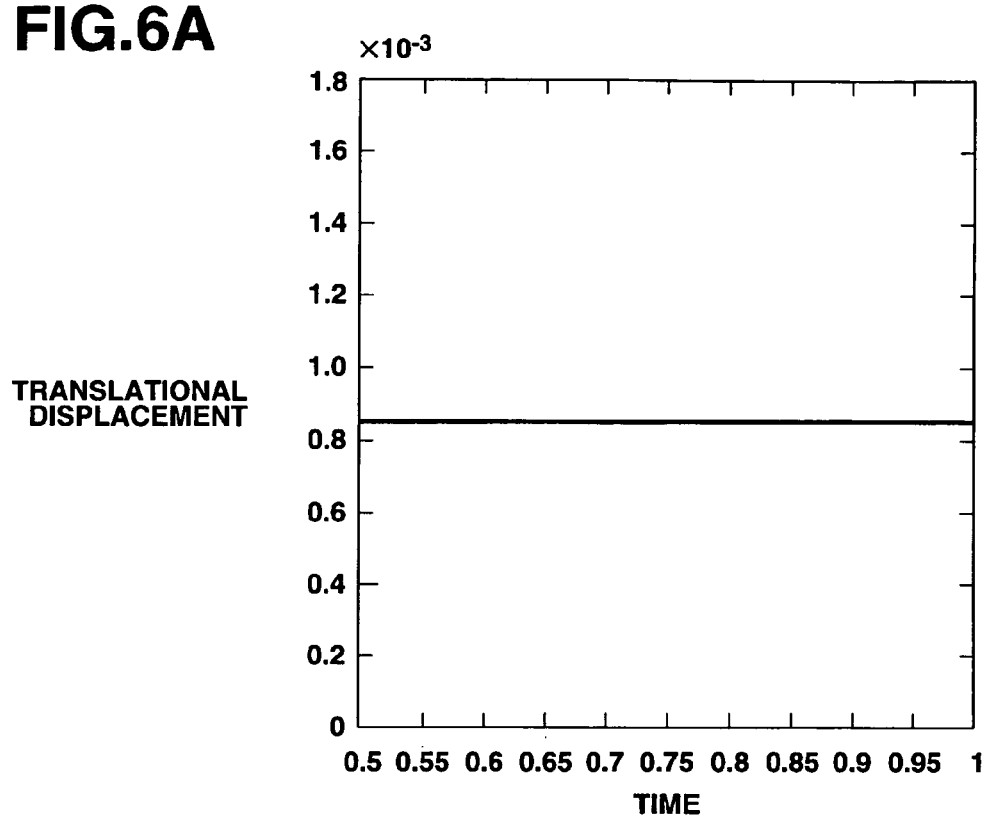
FIG. 6A is a diagram showing a translational displacement characteristic with damping.
Figure 6B:
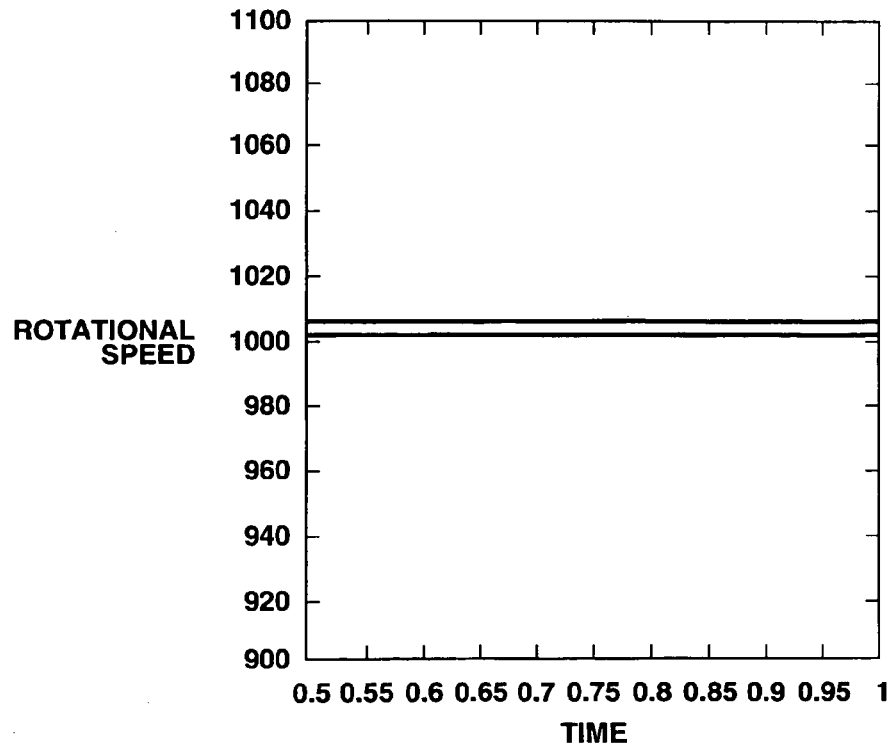
FIG. 6B is a diagram showing a rotational speed characteristic, with damping, of a cam-side roller and a fixed-side roller, respectively.

In the first embodiment, a viscous damping is used, and then the above equation (3) may be restated as follows. Note that the spring used in the damping mechanism is ignored.

$$m\ddot{x} + kx + c\dot{x} = F_t \quad (4)$$

wherein c represents a viscous damping coefficient, and $\dot{x}$ represents velocity of the displacement in the translational direction (first order differential value of x). FIGS. 5A and 5B respectively show the results of numerical calculation when no damping is provided to the translational displacement of the cam-side roller, and to the rotational speed of the cam-side roller and the fixed-side roller. FIGS. 6A and 6B respectively show the results of numerical calculation when damping is provided to the translational displacement of the cam-side roller, and to the rotational speed of the cam-side roller and the fixed-side roller. Thus, providing appropriate damping attenuates vibration.

Figure 7:
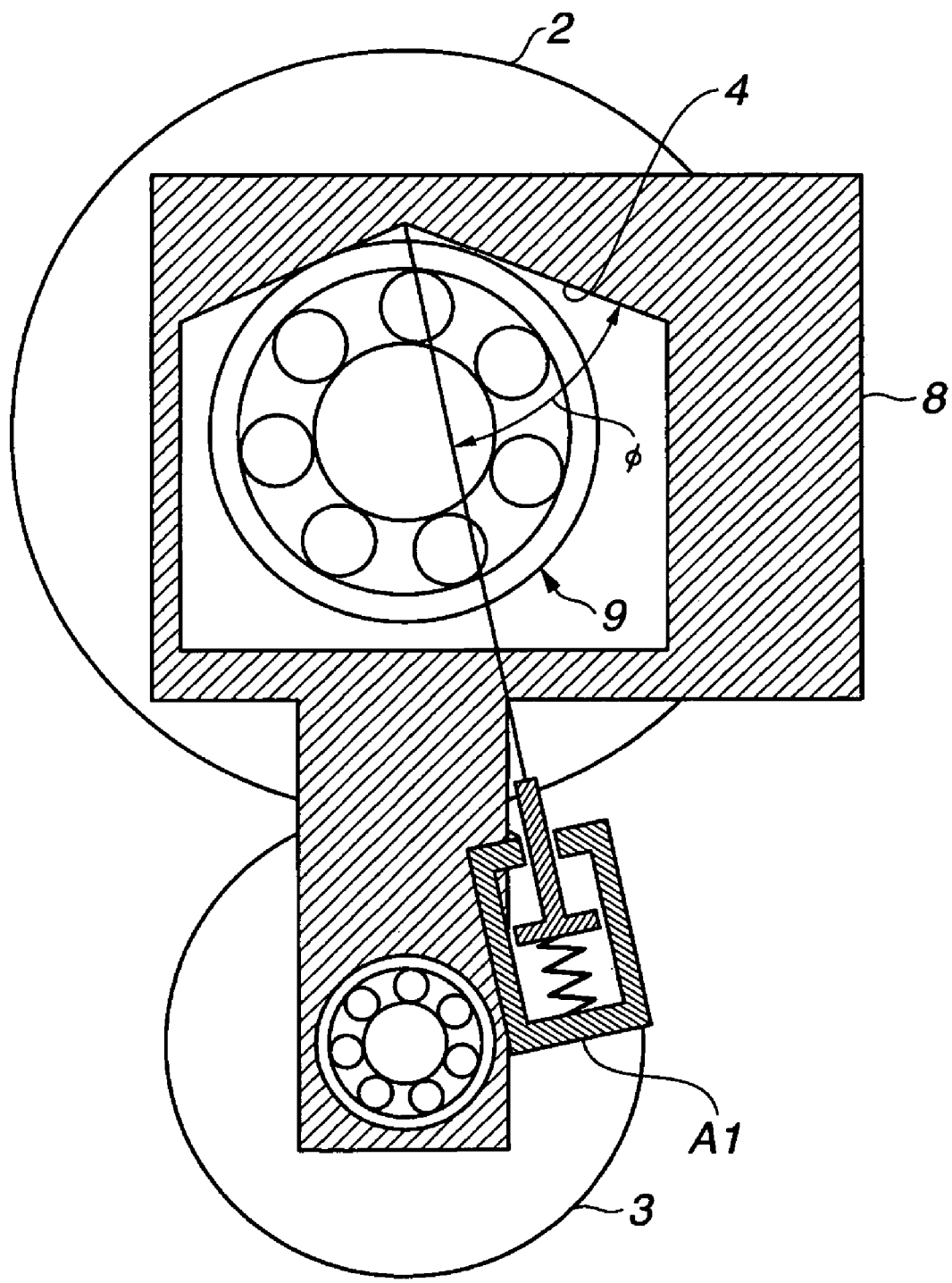
FIG. 7 is an explanatory diagram showing a mounting angle of a damping mechanism.

As shown in FIG. 7, the damper A1 may be disposed in a direction crossing the cam surface portion 4 at a large angle φ. The damping force f required for the damper A1 with respect to the angle φ is expressed by the following equation (5):

$$f = \frac{c\dot{x}}{\cos\phi} \quad (5)$$

If the angle φ is increased close to 90°, the force acting on the damper A1 will become too large and therefore undesirable. Moreover, if the angle φ is decreased close to 0°, the cos φ in equation (5) will become close to 1 so that the damping force f can be reduced. In the first embodiment shown in FIG. 1, the damping force can be decreased by setting the angle φ to the middle between the angle φ relative to the cam surface portion 4 and the angle φ relative to the cam surface portion 5. Although the possible translational directions of the drive roller 2 include all directions perpendicular to the rotation axis L of the drive roller 2, the direction in which the damping force acts is preferably a direction of displacement of the rotation axis L of the drive roller 2.

In the first embodiment, the damper A1 is pressed against the outer circumferential surface of the drive roller 2 supported by the cam surface portions 4 and 5. The damper A1 includes the piston 13 within the cylinder 11, which is filled with fluid. Viscous damping may be achieved as the fluid passes through the clearance 15 between the piston 13 and the cylinder 11. Preferably, the cylinder 11 is either defined by or disposed in the casing 1, and the spring 12 is interposed between and supported by an end portion of the piston 13 and a bottom of the cylinder 11. Preferably, the spring force of the spring 12 biases the piston 13 from the bottom of the cylinder 11.

As described above, in the friction drive device according to the first embodiment, the pressing mechanism may be the cam mechanism C, which includes the cam surface portions 4 and 5. Preferably, each of the cam surface portions 4 and 5 are inclined at the angle α relative to a tangent to the contacting portions of the drive roller 2 and the driven roller 3. The cam mechanism C presses together the drive roller 2 and the driven roller 3 by virtue of one or both of the cam surface portions 4 and 5 engaging the rotational support part S for the drive roller 2. Preferably, the damper A1 acts on the drive roller 2 that is supported for displacement in the translational direction perpendicular to the rotation axis L of the drive roller 2 and along the cam surface portions 4 and 5. For example, if the damper A1 is disposed in the direction crossing the cam surface portion 4 at a large angle φ (see FIG. 2), the damper A1 must provide a large damping force to the cam mechanism C, and therefore rigidity and strength of the damper A1 would need to be increased, which may not be desirable. In contrast, in the first embodiment shown in FIG. 1, the cam mechanism C presses together the drive and driven rollers 2 and 3, and the damper A1 is preferably disposed so as to act in a direction generally along the cam surface portions 4 and 5. Consequently, the drive and driven rollers 2 and 3 may be pressed together using the cam mechanism C, which has a simple construction, and the damping force provided by the damper A1 can be decreased, which is advantageous with respect to the required rigidity, strength, and size of the damper A1.

In the friction drive device according to the first embodiment, the damper A1 includes the cylinder 11 that provides the body of the damper and is filled with the fluid 14, the piston 13 that is biased by the spring 12 within the cylinder 11 and defines a clearance 15 between the cylinder 11 and the piston 13, and the piston rod 16 that extends from the piston 13 on the opposite side of the spring 12 and provides the damping force applying member. As shown in FIG. 1, when the piston rod 16 is displaced, the fluid 14 flows through the clearance 15 between the piston 13 and the cylinder 11 so that the viscous damping is provided.

In the friction drive device according to the first embodiment, the cylinder 11 of the damper A1 is disposed in the casing 1, and the piston rod 16 contiguously engages the outer circumferential surface of the drive roller 2 supported by the rotational support part S for displacement along the cam surface portions 4 and 5. Accordingly, design modification can be minimized, and torque fluctuation in the rotational direction that is caused between the drive roller 2 and the driven roller 3 can be effectively damped by additionally providing the damper A1 in the casing 1.

The friction drive device of the first embodiment may achieve the following effects.

According to a first effect, the friction drive device includes the pressing mechanism which establishes mutual press-contact between the drive roller 2 and the driven roller 3, which are rotatably supported with respect to the casing 1, so that torque is transmitted from one of the drive roller 2 and the driven roller 3 to the other thereof by using the friction force that is caused at the contacting portions of the drive roller 2 and the driven roller 3. Between the drive roller 2 and the driven roller 3, preferably the drive roller 2 is displaceable in the translation direction perpendicular to the rotation axis L thereof in order to cause the friction force at the contacting portions between the drive roller 2 and the driven roller 3. Moreover, the damper A1 is preferably provided with respect to the displacement of the drive roller 2 in the translation direction. Thus, the friction drive device may have a simple construction and may effectively damp torque fluctuation in the rotational direction that is caused between the drive roller 2 and the driven roller 3 without increasing the axial length of the friction drive device.

According to a second effect, the cam mechanism C presses together the drive roller and the driven roller 2 and 3, and includes the cam surface portions 4 and 5 that each have the angle α with respect to a tangent at the contact point between the drive roller 2 and the driven roller 3. The cam mechanism C provides contact between one or both of the cam surface portions 4 and 5 and the rotational support part S of the drive roller 2 so that the drive roller 2- and the driven roller 3 are maintained in press-contact with each other. The damper A1 preferably acts on the drive roller 2 with respect to the displacement of the drive roller 2 in the translational direction that is perpendicular to the rotation axis L of the drive roller 2 and along the cam surface portions 4 and 5. Thus, the cam mechanism C provides a simple construction for applying the press-contact force between the drive roller 2 and the driven roller 3, and the damper A1 may be disposed with respect to the translational direction such that the damping force required to be provided by the damper can be decreased so as to minimize the required rigidity, strength, and size of the damper A1.

According to a third effect, the damper A1 includes the cylinder 11 that provides the body of the damper and is filled with the fluid 14, the piston 13 that is biased by the spring 12 within the cylinder 11 and defines a clearance 15 between the cylinder 11 and the piston 13, and the piston rod 16 that extends from the piston 13 on the opposite side of the spring 12 and provides the damping force applying member. Accordingly, when the piston rod 16 is displaced in response to the translational direction, the fluid 14 flows through the clearance 15 between the piston 13 and the cylinder 11 so that the viscous damping may be achieved.

According to a fourth effect, the damper A1 preferably includes the cylinder 11 disposed on the casing 1, and the piston rod 16 in contiguous engagement with the outer circumferential surface of the drive roller 2 that is supported by rotational support part S for displacement in the translational direction along the cam surface portions 4 and 5. Consequently, design modification to the basic friction drive device can be minimized, and torque fluctuation in the rotational direction that is caused between the drive roller 2 and the driven roller 3 can be effectively damped by additionally providing the damper A1 on the casing 1.

Second Embodiment

In a second embodiment of the invention, the body of the damper is disposed on the cam member, and the damping member applies a contact force to the rotational support part of the drive roller.

The construction of the friction drive device according to the second embodiment will be explained with reference to FIG. 8. The friction drive device of the second embodiment includes a pressing mechanism that establishes mutual press-contact between drive roller 2 and driven roller 3, which are each rotatably supported with respect to the casing 1, and torque is transmitted from one of the drive roller 2 and the driven roller 3 to the other thereof by using the friction force caused at the contacting portions of the drive roller 2 and the driven roller 3.

The pressing mechanism is preferably a cam mechanism C that includes cam surface portions 4 and 5, each of which has an angle α with respect to a tangent at a contact point between the drive roller 2 and the driven roller 3. The cam mechanism C presses together the drive roller 2 and the driven roller 3 by virtue of one or both of the cam surface portions 4 and 5 contiguously engaging a rotational support part S that supports the drive roller 2.

Among the drive roller 2 and the driven roller 3, preferably the drive roller 2 is displaceable in a translational direction perpendicular to the rotation axis L thereof in order to cause a friction force at the contacting portions of the drive roller 2 and the driven roller 3, and a damper A1 is provided to damp the displacement of the drive roller 2 in the translational direction.

The damper A1 may act on the drive roller 2 that is supported by a rotational support part S for displacement along the cam surface portions 4 and 5 in response to the translational direction perpendicular to the rotation axis L and along the cam surface portions 4 and 5. The translational direction may include a direction approximately defined by the cam surface portions 4 and 5.

The damper A1 may include a cylinder 11, which may serve as a body of the damper A1 and is filled with a fluid 14 (e.g., oil or another generally incompressible fluid), a piston 13 that is biased by a spring 12 within the cylinder 1, and a piston rod 16 that extends from the piston 13 on an opposite side from the spring 12. Preferably, a clearance 15 is defined between the piston 13 and a wall of the cylinder 11, and the piston rod 16 acts as a damping member coupling the damper A1 with respect to the drive roller 2 and applying a damping force relative to displacement of the drive roller 2.

Figure 8:
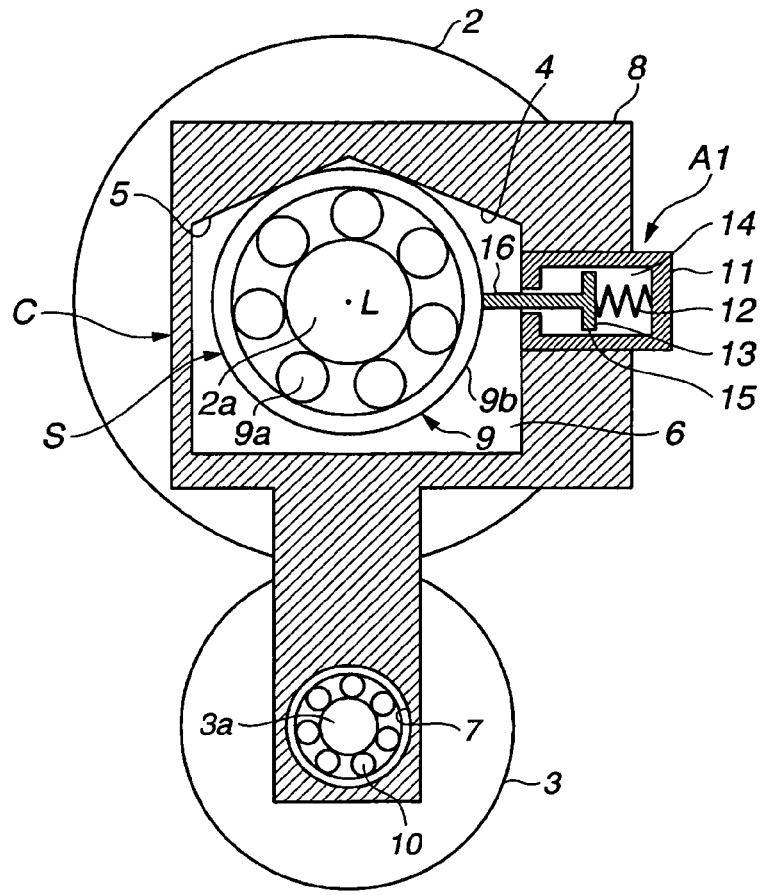
FIG. 8 is a general view showing a friction drive device according to a second embodiment of the invention.

As shown in FIG. 8, the cylinder 11 of the damper A1 may be disposed on the cam member 8 of the cam mechanism C, and the piston rod 16 as the damping member contiguously engages a cam follower 9b of the rotational support part S, which supports the drive roller 2 for translational displacement along the cam surface portions 4 and 5. The remaining parts of the friction drive device of the second embodiment are similar to those of the friction drive device of the first embodiment and their description will not be repeated.

A function of the friction drive device according to the second embodiment will now be explained. The damper A1 acts on a counterpart to provide a damping force. However, if the damping member of the damper A1 contiguously engages a rotating counterpart, e.g., the outer circumferential surface of the drive roller 2 in the first embodiment, some friction constantly occurs, thereby causing some torque loss. In contrast, according to the friction drive device of the second embodiment, the piston rod 16 contiguously engages the cam follower 9b, which rolls on the cam surface portions during translational displacement, whereby a constant friction loss with respect to rotation of the drive roller 2 will not occur and friction loss will occur only with respect to rotation of the cam follower 9B in response to torque fluctuation.

Figure 9A:
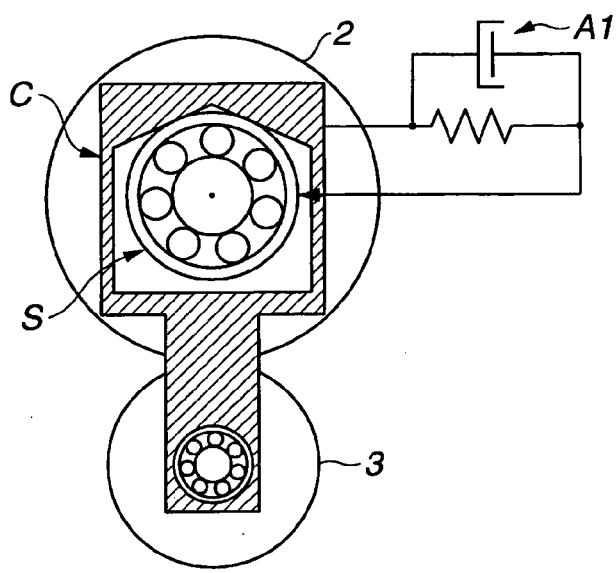
FIGS. 9A and 9B are schematic diagrams showing a kinetic model in the friction drive device according to the second embodiment.
Figure 9B:
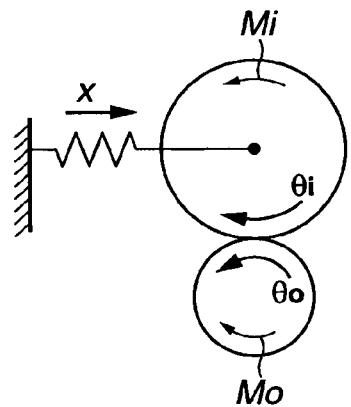

With additional reference to FIGS. 9A and 9B, the friction drive device of the second embodiment is schematically illustrated as a three-degrees of freedom model that allows the translation and the rotation of the drive roller 2 on the cam side, and the rotation of the driven roller 3 on the fixed side. Accordingly, other functions of the friction drive device of the second embodiment are similar to those of the first embodiment.

Next, the effects of the friction drive device according to the second embodiment will be explained. The friction drive device of the second embodiment can achieve the following effect in addition to the first, second and third effects described above with respect to the first embodiment.

According to a fifth effect, the damper A1 of the second embodiment includes the cylinder 11 disposed in the cam member 8 of the cam mechanism C, and the piston rod 16 that serves as the force applying damping member contiguously engages the cam follower 9b of the rotational support part S of the drive roller 2, which is supported for rolling translational displacement along the cam surface portions 4 and 5. Accordingly, friction losses due to rotation of the drive roller relative to the damping member may be reduced while still effectively damping torque fluctuation in the rotational direction between the drive roller 2 and the driven roller 3.

Third Embodiment

In a third embodiment according to the invention, a damper additionally provides a damping force in a direction along the cam surface portion on a side of negative torque, i.e., an additional damping force is provided as compared to the friction drive device according to the second embodiment.

Figure 10:
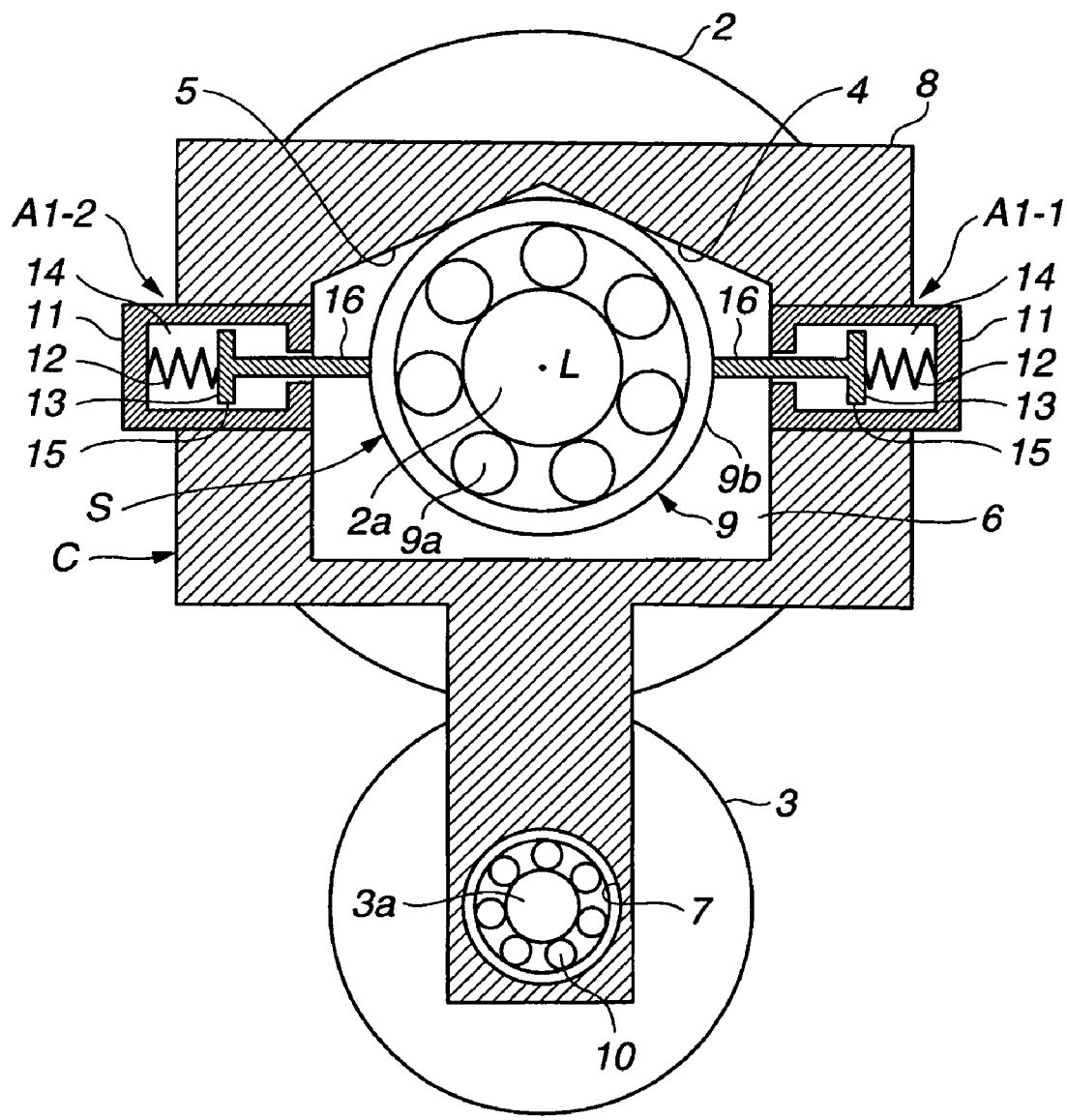
FIG. 10 is a general view showing a friction drive device according to a third embodiment of the invention.

The construction of the friction drive device according to the third embodiment will be explained with reference to FIG. 10. The damper includes a first damper mechanism A1-1 that acts in a direction along the cam surface portion 4 in response to positive torque and a second damper A1-2 that acts in a direction along the cam surface portion 5 in response to negative torque. The remaining parts of the friction drive device of the third embodiment are similar to those of the friction drive device according to the second embodiment and their description will not be repeated.

Next, the effects of the friction drive device according to the third embodiment will be explained. As described with respect to the friction drive device according to the second embodiment, the damper A1 applies a damping force to the cam follower 9b primarily when the cam follower 9b advances along the cam surface portion 4; however, a reduced damping force may be applied when the cam follower 9b retreats. In order to produce the damping force in both of the advancing and retreating directions using only the damper A1 according to the second embodiment, a complicated link mechanism would be required for connecting together the cam follower 9b and the damper A1. In contrast, a friction drive device according to the third embodiment provides a damping force that may be exerted on the cam follower 9b in the positive torque direction and in the negative torque direction using the first damper A1-1 and the second damper A1-2, respectively. Other functions of the friction drive device according to the third embodiment are similar to those of the friction drive devices of the first and second embodiments and their description will not be repeated.

Next, effects of the friction drive device according to the third embodiment will be explained. The friction drive device according to the third embodiment can achieve the following effect in addition to the first, second and third effects described above with respect to the first embodiment, and in addition to the fifth effect described above with respect to the second embodiment.

According to a sixth effect, the damper includes the first damper mechanism A1-1 that provides a damping force primarily in a direction generally along the cam surface portion 4 in response to positive torque and the second damper mechanism A1-2 that provides a damping force primarily in a direction generally along the cam surface portion 5 in response to negative torque. Accordingly, the damping force can be exerted on the cam follower 9b in response to both positive torque and to negative torque direction by contiguously engaging the cam follower 9b with the first damper mechanism A1-1 and the second damper mechanism A1-2, respectively. Moreover, the second damper mechanism A1-2 may provide primary damping in response to a reduction in positive torque, and the first damper mechanism A1-1 may provide primary damping in response to a reduction in negative torque.

Fourth Embodiment

In a fourth embodiment according to the invention, a friction reducing element is provided at a contact portion of the damping force applying member of the third embodiment which is contacted with the cam follower 9b of the drive roller 2.

Figure 11:
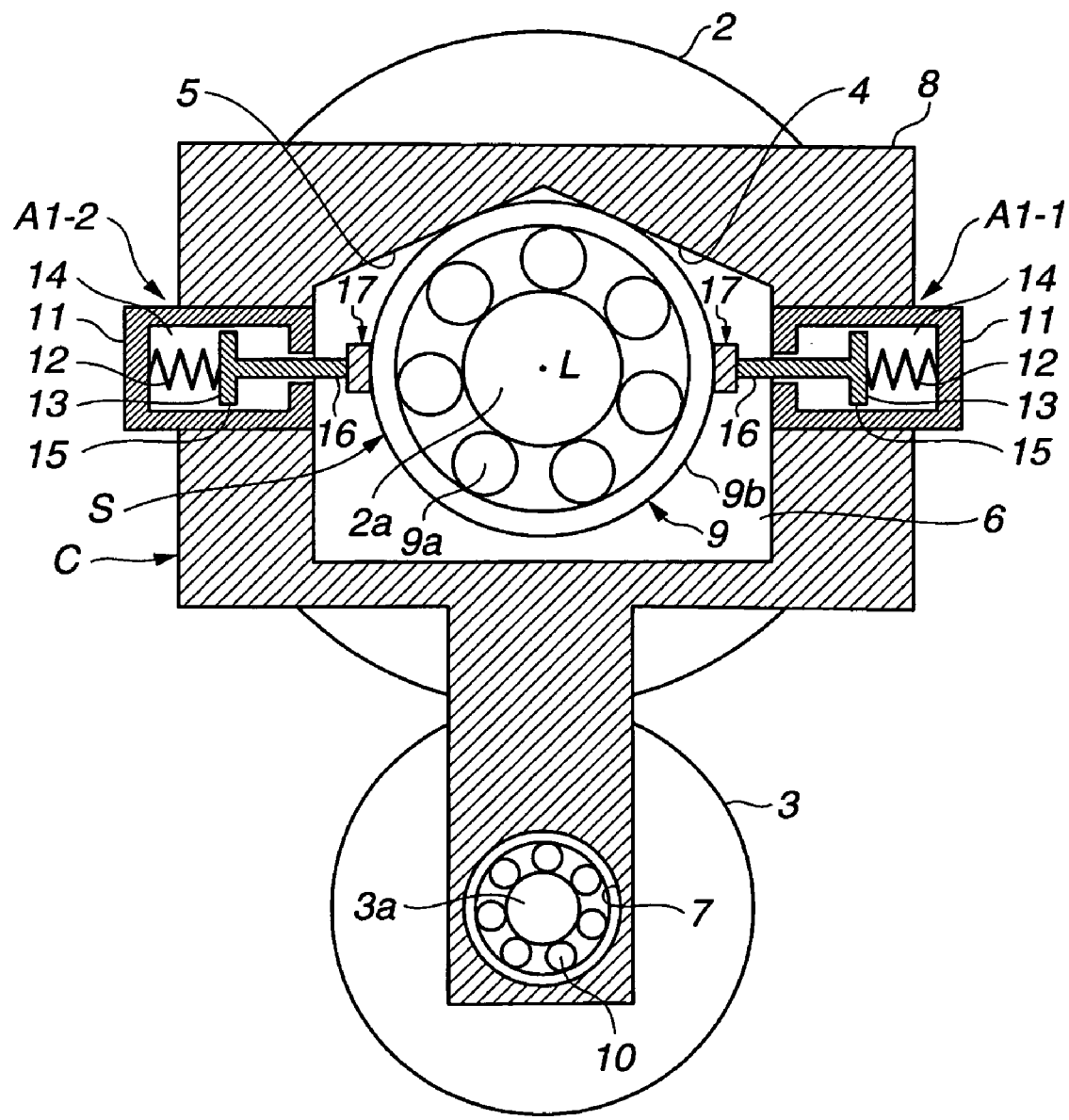
FIG. 11 is a general view showing a friction drive device according to a fourth embodiment of the invention.

The construction of the friction drive device according to the fourth embodiment will be explained with reference to FIG. 11. The friction drive device according to the fourth embodiment includes a sliding bearing 17 that serves as a friction-reducing element and is disposed at contact portions between the cam follower 9b and the piston rods 16 that serve as the damping members of each of the dampers A1-1 and A1-2. The remaining parts of the friction drive device according to the fourth embodiment are similar to those of the friction drive device according to the third embodiment and their description will not be repeated.

Next, functions of the friction drive device of the fourth embodiment will be explained. As the cam follower 9b rolls on the cam surface portions 4 and 5, sliding contact may occur at the contact portions with the piston rods 16. Such sliding could cause abrasion. In contrast, in the friction drive device of the fourth embodiment, the sliding bearing 17 is provided at the contact portion of the piston rod 16 which is contacted with the cam follower 9b, so that occurrence of abrasion at the contact portion of the piston rod 16 is avoided.

Next, effects of the friction drive device according to the fourth embodiment will be explained. The friction drive device according to the fourth embodiment can achieve the following effect in addition to the third effect described above with respect to the first embodiment, the fifth effect described above with respect to the second embodiment, and the sixth effect described above with respect to the third embodiment.

According to a seventh effect, each of the damper mechanisms A1-1 and A1-2 include sliding bearings 17 disposed at the contact portion of the piston rod 16 with the cam follower 9b. Accordingly, the piston rods 16 as the force applying damping members can avoid relative abrasion with respect to the cam follower 9b, and torque fluctuation in the rotational direction between the drive roller 2 and the driven roller 3 can be effectively damped. Further, the sliding bearing 17 can be provided at the contact portion of the piston rod 16 of the damper A1 of the first embodiment. In such a case, the fourth effect of the first embodiment may also be achieved.

Fifth Embodiment

In a fifth embodiment according to the invention, a friction force damper that provides a friction force device may be substituted for the dampers according to the first to fourth embodiments.

Figure 12:
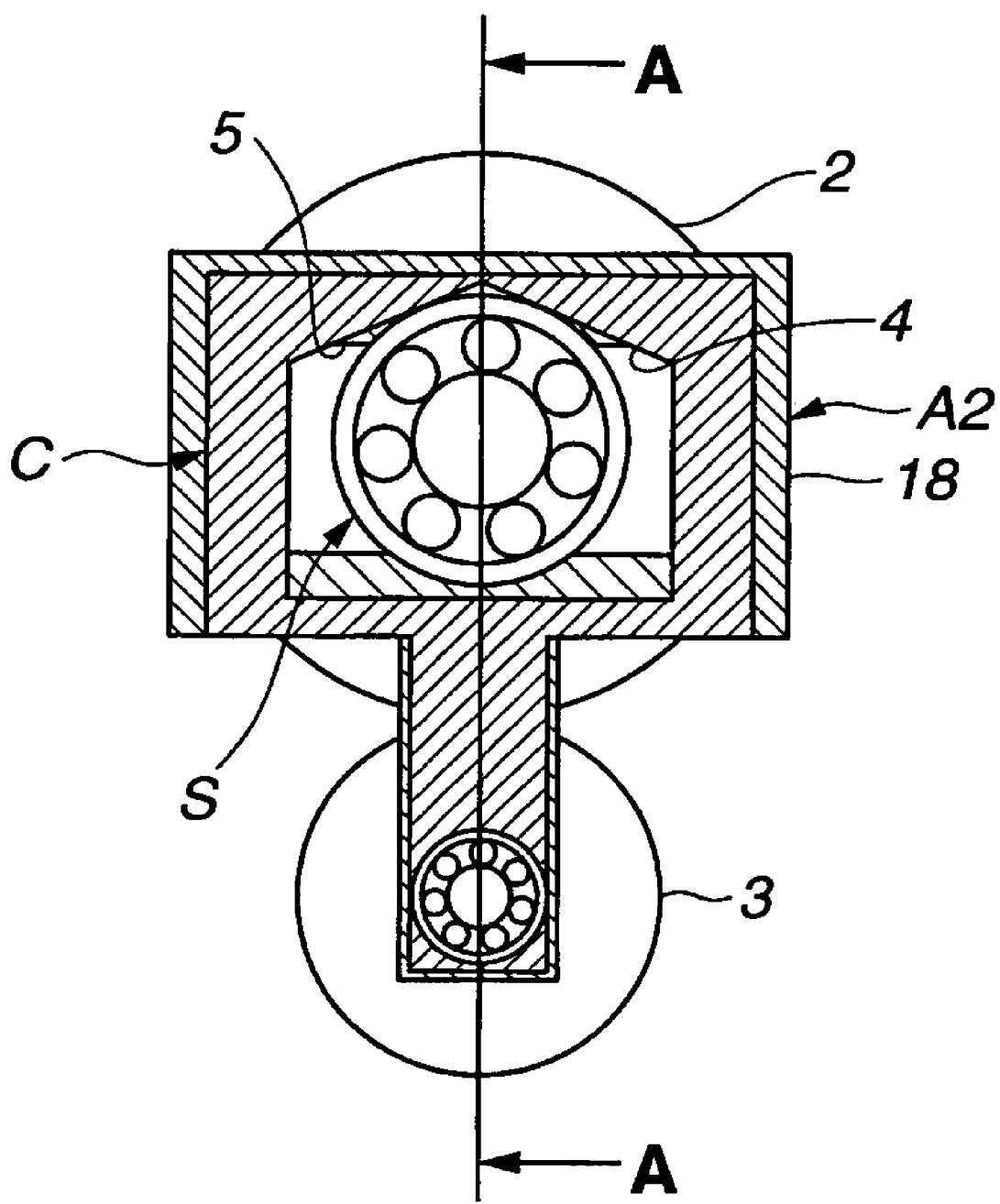
FIG. 12 is a general view showing a friction drive device according to a fifth embodiment of the invention.
Figure 13:
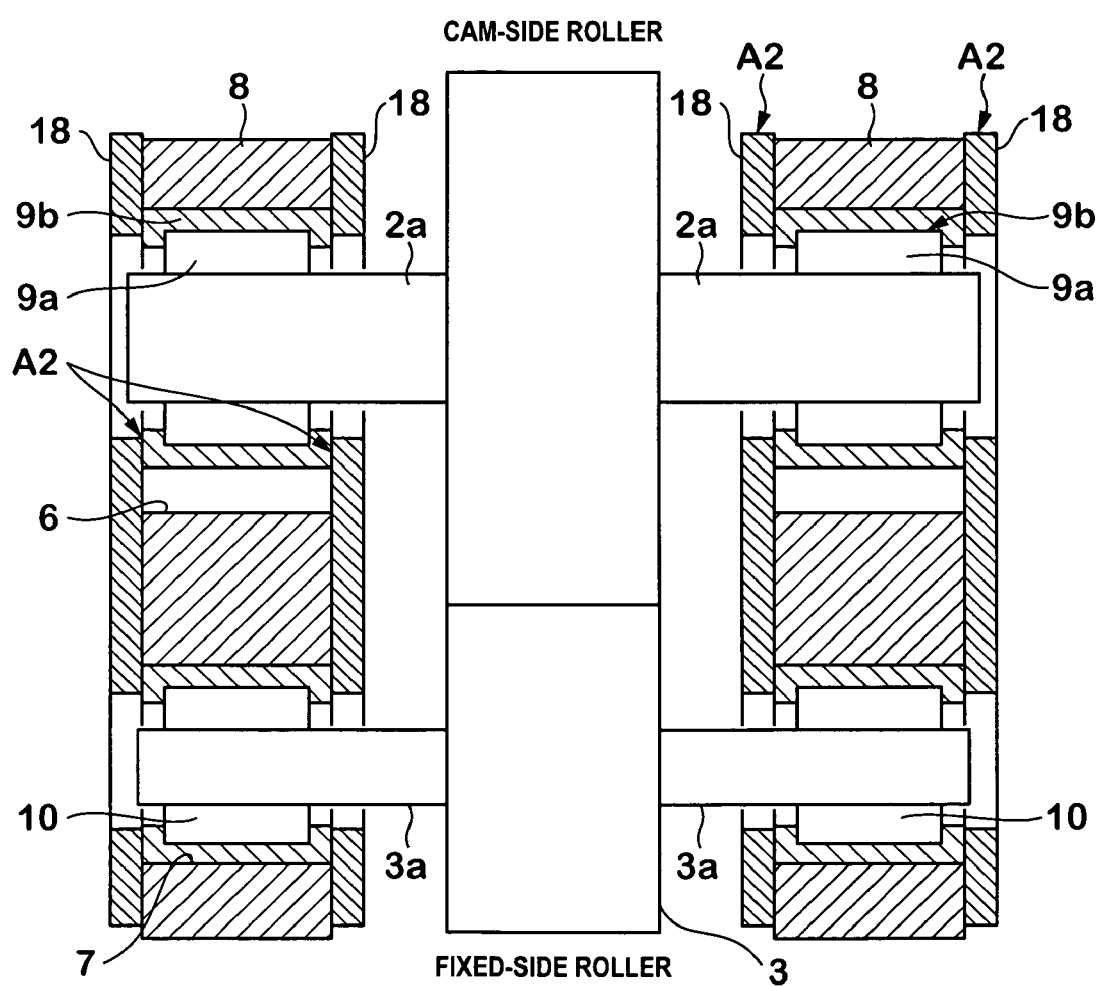
FIG. 13 is a cross-section, taken along line A-A of FIG. 12, of the friction drive device according to the fifth embodiment of the invention.

The construction of the friction drive device according to the fifth embodiment will be explained with reference to FIGS. 12 and 13. The friction drive device according to the fifth embodiment includes a friction force damper A2 that includes a pair of retaining plates 18, 18 that are mounted to the cam member 8. The retaining plates 18, 18 are disposed on both sides of the cam follower 9b of the rotational support part S for the drive roller 2. As was described above with respect to the first to fourth embodiments, the cam follower 9b of the rotational support part S rolls on the cam surface portions 4 and 5 in response to translational displacement. There is relative sliding frictional engagement between the retaining plates 18, 18 and both side surfaces of the cam follower 9b. The remaining parts of the friction drive device of the fifth embodiment are similar to those of the friction drive device of the first embodiment and their description will not be repeated.

Next, functions of the friction drive device of the fifth embodiment will be explained. When the cam follower 9b of the rotational support part S rolls on the cam surface portions 4 and 5 in response to translational displacement of the drive roller 2, the retaining plates 18, 18 frictionally engage both side surfaces of the cam follower 9b, which applies a damping force to the drive roller 2 through the cam follower 9b. The damping force provides damping known as Coulomb friction in vibration engineering. Other functions of the friction drive device of the fifth embodiment are similar to those of the friction drive device of the first embodiment and will not be repeated.

Next, effects of the friction drive device according to the fifth embodiment will be explained. The friction drive device according to the fifth embodiment can achieve the following effect in addition to the first and second effects described above with respect to the first embodiment.

According to an eighth effect, the friction force damper A2 provides sliding, frictional engagement between the pair of retaining plates 18, 18 that are mounted with respect to the cam member 8 and the side surfaces of the cam follower 9b.

The cam follower 9*b* of the rotational support part S rolls on the cam surface portions 4 and 5 in response to translational displacement of the rotational support part S of the drive roller 2. Accordingly, the friction force damper A2 can effectively damp torque fluctuation in the rotational direction which is caused between the drive roller 2 and the driven roller 3, by using the friction force caused between the side surfaces of the cam follower 9*b* and the retaining plates 18, 18 when the cam follower 9*b* rolls on the cam surface portions 4 and 5 in response to translational displacement of the drive roller 2.

Sixth Embodiment

In a sixth embodiment according to the invention, a servomechanism, which may include an actuator and a control circuit in fluid communication with the actuator, provides a damper for a friction drive device.

Figure 14:
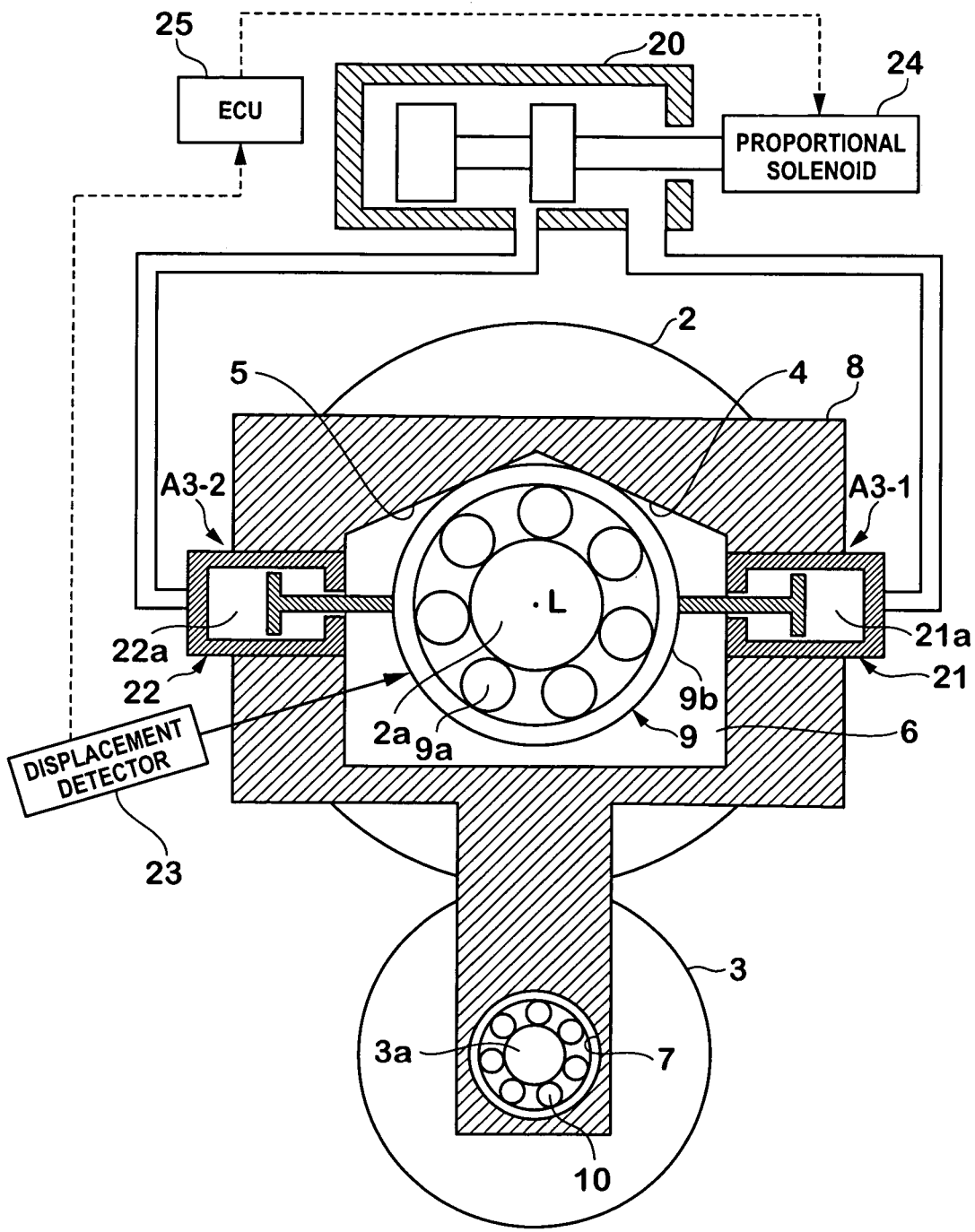
FIG. 14 is a general view showing a friction drive device according to a sixth embodiment of the invention.

The construction of the friction drive device according to the sixth embodiment will be explained with reference to FIG. 14. The friction drive device according to the sixth embodiment is provided with a servomechanism type damper that includes a servo valve 20 with an actuator 24, a first servo damper A3-1, a second servo damper A3-2, and a network of fluid communication passages. Preferably, the actuator 24 includes a proportional solenoid, and preferably the fluid is a substantially incompressible liquid such as hydraulic oil. The first servo damper A3-1 may include a first hydraulic cylinder 21 defining a first cylinder chamber 21*a* that is connected by a fluid communication passage to the servo valve 20. Similarly, the second servo damper A3-2 may include a second hydraulic cylinder 22 defining a second cylinder chamber 22*a* that is connected by a fluid communication passage to the servo valve 20. An orifice (not shown) may be provided in each of the fluid communication passages that are connected to the first cylinder chamber 21*a* and to the second cylinder chamber 22*a*. The servomechanism damper may also include a translational displacement detector 23 that detects an amount of the translational displacement by the drive roller 2. As was described above with respect to the first to fifth embodiments, the cam follower 9*b* of the rotational support part S rolls on the cam surface portions 4 and 5 in response to translational displacement. The servomechanism damper may further includes a damping force controller 25, such as an electronic control unit, which controls the actuator 24 of the servo valve 20 by feeding back information such as the amount of translational displacement detected by the detector 23. The remaining parts of the friction drive device of the sixth embodiment are similar to those of the friction drive device of the third embodiment and will not be repeated.

Next, functions of the friction drive device of the sixth embodiment will be explained. The damping force controller 25 may receive information on the amount of translational displacement from the translational displacement detector 23 and output a control signal to the valve actuator 24 of the servo valve 20 depending on the information provided regarding translational displacement by the drive roller 2. That is, the damping force controller 25 may control hydraulic pressure that is supplied to the first servo and second servo dampers A3-1 and A3-2, and thereby determine the damping force in response to the amount of translational displacement of the drive roller 2. Consequently, the friction drive device according to the sixth embodiment applies active controls to the damping force to thereby further enhance the damping performance as compared to the first to fifth embodiments.

Next, effects of the friction drive device according to the sixth embodiment are explained. The friction drive device according to the sixth embodiment can achieve the following effect in addition to the first effect described above with respect to the first embodiment and in addition to the eighth effect described above with respect to the fifth embodiment.

According to a ninth effect, the damper is provided by the servomechanism that includes the servo valve 20, the first servo damper A3-1, which includes the first hydraulic cylinder 21 defining the first cylinder chamber 21*a*, the second servo damper A3-2, which includes the second hydraulic cylinder 22 defining the second cylinder chamber 22*a*, and a network of fluid communications through which a fluid, e.g., oil, may flow between the servo valve 20 and the first and second cylinder chambers 21*a* and 22*a*. The servomechanism further includes the translational displacement detector 23 that detects the amount of translational displacement by the drive roller 2, and the damping force controller 25 that controls the actuator 24 for the servo valve 20 by feeding back information on the amount of translational displacement of the drive roller 2 that is provided from the translational displacement detector 23. Accordingly, the first and second servo dampers A3-1 and A3-2 provide a controlled, servo function that may further enhance the performance of absorbing and damping torque fluctuation.

In the first to sixth embodiments, the cam mechanism is used as the pressing mechanism. However, any configuration of mechanism that presses together the drive roller and the driven roller may be substituted in the first to sixth embodiments. For example, in the cam mechanism according to the first to sixth embodiments, the angle of the cam surface portion with respect to a tangent at the contact point between the drive roller 2 and the driven roller 3 is a generally constant value. However, the angle of the cam surface portion may be stepwise or continuously increased as a distance between the contact point and an imaginary line extending through the rotation axes of the drive roller 2 and the driven roller 3 increases.

The damper A1 is described in connection with the first to fourth embodiments, the friction force damper A2 is described in connection with the fifth embodiment, and the servomechanism type damper A-3 is described in connection with the sixth embodiment. However, the particular construction of a damping force mechanism is not limited to the specific constructions shown in the first to sixth embodiments. Any type of damper may be used to apply a damping force relative to the translational displacement of the roller.

In the friction drive device according to the first to sixth embodiments, a drive roller is used as the roller displaceable in the translational direction. However, if a driven roller is used as the roller that is displaceable in the translational direction, then the damper may be provided to apply a damping force relative to the translational displacement of the driven roller.

In the friction drive device according to the first to sixth embodiments, a drive roller is used as the roller that is displaceable in a translational direction with respect to the casing. However, if a cam mechanism is displaceable in the translational direction with respect to the casing, the damper can be provided to apply a damping force relative to the translational displacement of the cam mechanism. In other words, regarding a drive roller as being a fixed side, a damping force acts on the translational displacement of the cam mechanism.

The friction drive device of the invention may also be applied to different types of equipment that require power transmission function and speed change function, without being limited to vehicular transmission applications.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A friction drive device for transmitting torque by frictional contact between rollers, the friction drive device comprising:
   a casing;
   a drive roller supported for relative rotation with respect to the casing;
   a driven roller supported for relative rotation with respect to the casing;
   a cam mechanism pressing an outer circumferential surface of the drive roller and an outer circumferential surface of the driven roller into contact with each other, the cam mechanism including:
      a cam surface disposed at an angle with respect to a tangent of the contact between the drive roller and the driven roller; and
      a rotational support part being disposed on the cam surface and supporting one of the drive roller and the driven roller, wherein displacement along the cam surface by the rotational support part maintains the frictional contact for transmitting the torque; and
   a damper reducing vibration of the rotational support part.

2. A friction drive device as claimed in claim 1, wherein the damper comprises a damping member coupled to the one of the drive roller and the driven roller.

3. A friction drive device as claimed in claim 2, wherein the damper comprises:
   a body defining a cylinder;
   a piston being disposed in the cylinder and being supported for relative reciprocation with respect to the body;
   an oil chamber being defined by the body and the piston, wherein the cylinder includes the oil chamber; and
   a spring disposed in the oil chamber, the spring engaging a first side of the piston to bias the piston with respect to the body;
   wherein the damping member includes a piston rod extending from a second side of the piston that is opposite to the first side.

4. A friction drive device as claimed in claim 3, wherein the casing comprises the body of the damper.

5. A friction drive device as claimed in claim 2, wherein the damping member contact an outer circumferential surface of the one of the drive roller and the driven roller.

6. A friction drive device as claimed in claim 2, wherein the damping member contacts the rotational support part.

7. A friction drive device as claimed in claim 6, wherein a body of the damper is disposed on the cam mechanism.

8. A friction drive device as claimed in claim 2, wherein the rotational support part comprises a portion rolling on the cam surface, and the damping member comprises a friction-reducing element disposed in contact with the rolling portion of the rotational support part.

9. A friction drive device as claimed in claim 1, wherein the rotational support part comprises a portion rolling on the cam surface, and the damper comprises a retaining plate being mounted to the cam mechanism and frictionally engaging side surfaces of the rotational support part.

10. A friction drive device as claimed in claim 2, wherein the damper comprises:
    a servo valve;
    an actuator operating the servo valve;
    a first cylinder chamber in fluid communication with the servo valve;
    a second cylinder chamber in fluid communication with the servo valve;
    a detector sensing translational displacement of the one of the drive roller and the driven roller; and
    a controller receiving from the detector an information signal corresponding to the translational displacement and outputting to the actuator a control signal wherein fluid pressure in the first and second cylinder chambers is controlled in response to the translational displacement.

11. A friction drive device as claimed in claim 1, wherein the cam surface comprises:
    a first surface portion pressing the drive roller and the driven roller into contact in response to positive torque; and
    a second surface portion pressing the drive roller and the driven roller into contact in response to negative torque; and
    the damper comprises:
    a first damping mechanism acting in a first displacement of the first surface portion; and
    a second damping mechanism acting in a second displacement of the second surface portion.

12. A friction drive transmission for transmitting torque by frictional contact between rollers, the friction drive transmission comprising:
    a casing;
    a drive roller supported for relative rotation with respect to the casing, the drive roller including a first plurality of different diameter rollers;
    a driven roller supported for relative rotation with respect to the casing, the driven roller including a second plurality of different diameter rollers;
    a cam mechanism pressing the drive roller and the driven roller into contact with each other, the cam mechanism including:
       a cam surface disposed at an angle with respect to a tangent of the contact between the drive roller and the driven roller; and
       a rotational support part being disposed on the surface and supporting one of the drive roller and the driven roller, wherein displacement along the cam surface by the rotational support part maintains the frictional contact for transmitting the torque;
    a damper reducing vibration of the rotational support part; and
    a shifter selectively and independently contiguously engaging one of the first plurality of different diameter rollers with a corresponding one of the second plurality of different diameter rollers.

13. The friction drive transmission as claimed in claim 12, wherein the shifter changes a distance between axes of rotation of the corresponding ones of the first and second pluralities of different diameter rollers that are selectively and independently contiguously engaged.

* * * * *